US010241725B2

(12) United States Patent
Chen et al.

(10) Patent No.: US 10,241,725 B2
(45) Date of Patent: Mar. 26, 2019

(54) WORKLOAD BALANCING IN A DISTRIBUTED STORAGE SYSTEM

(71) Applicant: International Business Machines Corporation, Armonk, NY (US)

(72) Inventors: Lei Chen, Shanghai (CN); Yue Hu, Shanghai (CN); Jun Wei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 111 days.

(21) Appl. No.: 14/927,581

(22) Filed: Oct. 30, 2015

(65) Prior Publication Data

US 2017/0123661 A1    May 4, 2017

(51) Int. Cl.
| | |
|---|---|
| *G06F 12/00* | (2006.01) |
| *G06F 3/06* | (2006.01) |
| *G06F 13/00* | (2006.01) |
| *G06F 13/28* | (2006.01) |

(52) U.S. Cl.
CPC .......... *G06F 3/067* (2013.01); *G06F 3/0611* (2013.01); *G06F 3/0613* (2013.01); *G06F 3/0653* (2013.01); *G06F 3/0659* (2013.01)

(58) Field of Classification Search
CPC .... G06F 3/0604; G06F 3/0629; G06F 3/0653; G06F 3/067; G06F 3/0689
See application file for complete search history.

(56) References Cited

U.S. PATENT DOCUMENTS

| | | | | |
|---|---|---|---|---|
| 7,693,847 | B1 * | 4/2010 | Brown | .................. G06F 9/5038 |
| | | | | 707/694 |
| 8,478,952 | B1 * | 7/2013 | Armorer | ............. G06F 11/1461 |
| | | | | 711/111 |
| 8,719,401 | B1 | 5/2014 | Gulati et al. | |
| 8,850,288 | B1 | 9/2014 | Lazier et al. | |

(Continued)

FOREIGN PATENT DOCUMENTS

WO    2015030900 A1    3/2015

OTHER PUBLICATIONS

Gulati et al.; "Modeling Workloads and Devices for IO Load Balancing in Virtualized Environments"; 2009, 8 pages, printed on Aug. 11, 2015.

(Continued)

*Primary Examiner* — Mark A Giardino, Jr.
(74) *Attorney, Agent, or Firm* — Isaac J. Gooshaw (57) ABSTRACT

As disclosed herein a method, executed by a computer, includes analyzing historical I/O data, corresponding to one or more applications, to determine an expected available bandwidth for a plurality of storage devices of a distributed storage system, and generating a data retrieval plan for the plurality of storage devices storage devices based on a historical I/O access pattern and according to the expected available bandwidth for the plurality of storage devices. The method further includes accessing data for a backend computational job from the plurality of storage devices according to the data retrieval plan, and throttling I/O throughput for the backend computational job according to the expected available bandwidth for the plurality of storage devices. A computer system and computer program product corresponding to the above method are also disclosed herein.

16 Claims, 5 Drawing Sheets

(56) References Cited

U.S. PATENT DOCUMENTS

| | | | |
|---|---|---|---|
| 2002/0120741 A1* | 8/2002 | Webb | G06F 11/3093 709/225 |
| 2004/0230742 A1 | 11/2004 | Ikeuchi et al. | |
| 2013/0246705 A1 | 9/2013 | Diare | |
| 2013/0346540 A1 | 12/2013 | Dean et al. | |
| 2014/0380007 A1 | 12/2014 | Suen et al. | |

OTHER PUBLICATIONS

"Storage I/O Control Technical Overview and Considerations for Deployment"; VMware; vSphere™ 4.1; Technical White Paper; Copyright © 2010 VMware, Inc; pp. 1-12.

* cited by examiner

Data Retrieval Plan

| Disk ID | Total Bandwidth | Available Bandwidth | Data Replica |
|---|---|---|---|
| Disk 1 | 180,000 | 80,000 | R1, R3, R7, R13, ... |
| Disk 2 | 500,000 | 100,000 | R1, R2, R5, R11, ... |
| Disk 3 | 180,000 | 90,000 | R1, R7, R8, R10, ... |
| ... | ... | ... | ... |

| Disk ID | Total Bandwidth | Available Bandwidth | Data Replica |
|---|---|---|---|
| Disk 2 | 500,000 | 100,000 | R1, R2, R5, R11, ... |
| Disk 3 | 180,000 | 90,000 | ~~R1~~, R7, R8, R10, ... |
| Disk 1 | 180,000 | 80,000 | ~~R1~~, R3, ~~R7~~, R13, ... |
| ... | ... | ... | ... |

WORKLOAD BALANCING IN A DISTRIBUTED STORAGE SYSTEM

BACKGROUND

The present invention relates to intrusion prevention systems, and more particularly real-time intrusion analysis and signature generation for intrusion prevention systems.

A distributed storage system is a client/server architecture used for storing and accessing data over a network. In a distributed storage system, one or more storage servers are accessible by a number of remote clients and servers in the network. The purpose of distributed storage systems is to store data reliably over long periods of time, using a distributed collection of storage nodes. To ensure reliability, data is replicated (i.e., stored redundantly) across the distributed storage nodes.

SUMMARY

As disclosed herein a method, executed by a computer, includes analyzing historical I/O data, corresponding to one or more applications, to determine an expected available bandwidth for a plurality of storage devices of a distributed storage system, and generating a data retrieval plan for the plurality of storage devices based on a historical I/O access pattern and according to the expected available bandwidth for the plurality of storage devices. The method further includes accessing data for a backend computational job from the plurality of storage devices according to the data retrieval plan, and throttling I/O throughput for the backend computational job according to the expected available bandwidth for the plurality of storage devices. A computer system and computer program product corresponding to the above method are also disclosed herein.

DETAILED DESCRIPTION

In today's highly computerized world, the daily operation of corporations and activities of individuals are highly dependent on computers. Corporations rely on computers and computer applications to operate their business and to provide services to their customers. Individuals use computers to manage and maintain many aspects of their lives (e.g., communication, entertainment, shopping, banking, etc.).

With the globally expanding popularity of online access to shopping, banking and entertainment, data associated with the operation of these online activities must be quickly accessible. The data may be stored in a distributed storage system that consists of one or more network connected servers (data sources or storage nodes) that provide data storage. The servers and data can be accessed by remote clients in the network. To assure data accessibility and reliability, the data is replicated on the storage nodes throughout the distributed storage system.

Delays in retrieving or writing data may result in an unresponsive application and dissatisfied users. Data corresponding to an application (e.g., an online shopping application) may be read and/or written when an end user is browsing an online catalog and ordering merchandise. The data may also be referenced (i.e., read) by a backend computational job performing activities such as inventory or analytics analysis. The backend computational job may be very I/O intensive (when reading data) and consume a majority of the available I/O bandwidth causing users of the online shopping application to experience slow response times. It has been observed that there is a need for workload balancing in a distributed storage system. The embodiments disclosed herein generally address the above-described problems.

Figure 1:
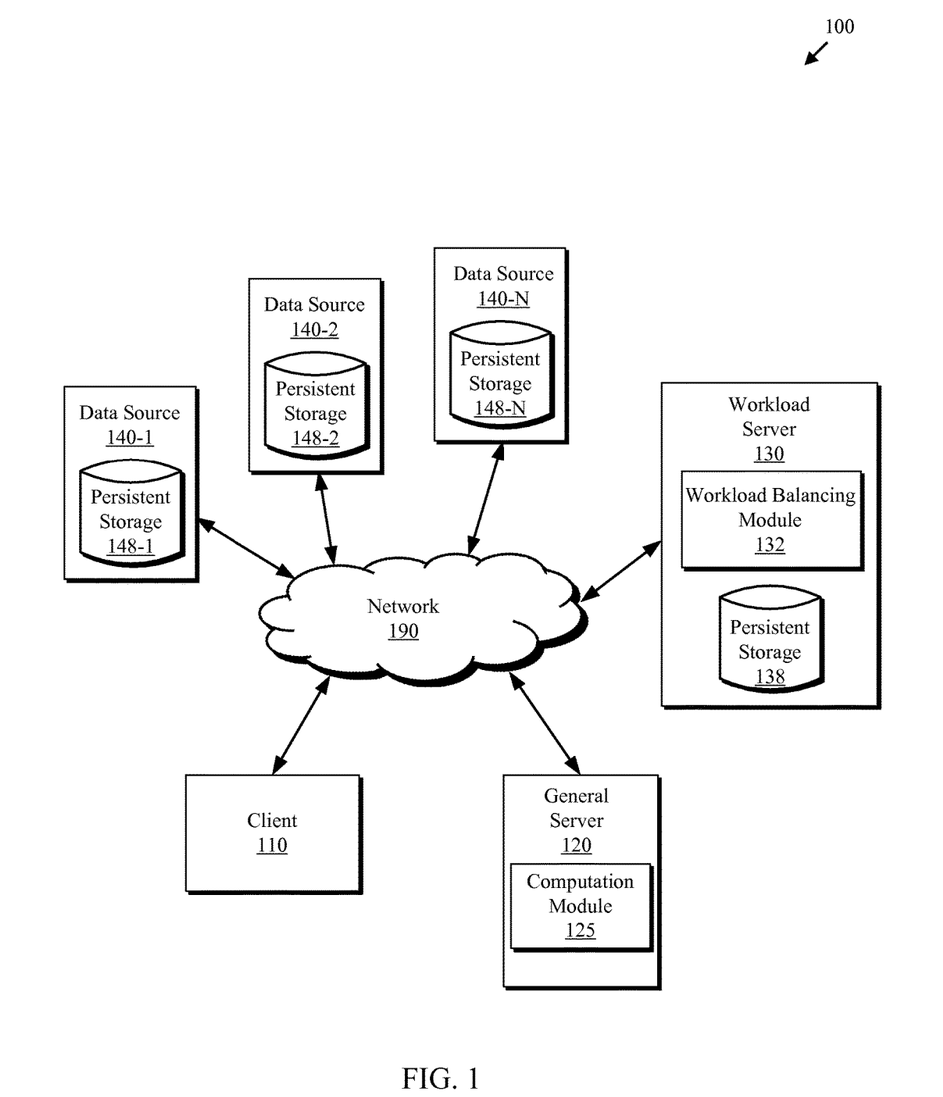
FIG. 1 is a functional block diagram depicting a computing environment, in accordance with at least one embodiment of the present invention.

The present invention will now be described in detail with reference to the Figures. FIG. 1 is a functional block diagram depicting computing environment 100, in accordance with an embodiment of the present invention. Computing environment 100 includes client 110, general server 120, workload server 130, and data sources 140 (e.g., 140-1 to 140-N). Client 110, general server 120, workload server 130, and data sources 140 can include smart phones, tablets, desktop computers, laptop computers, specialized computer servers, or any other computer systems, known in the art, capable of communicating over network 190. In general, client 110, general server 120, workload server 130, and data sources 140 are representative of any electronic devices, or combination of electronic devices, capable of executing machine-readable program instructions, as described in greater detail with regard to FIG. 5.

Client 110, general server 120, and workload server 130 may access data on one or more of data sources 140. Data sources 140 may be part of a distributed storage system. As depicted, data sources 140 include persistent storage 148 (e.g. persistent storage 148-1 through 148-N) to store data. The data may be stored using files and file system technology, database technology, or any other technology known to those of skill in the art. In some embodiments, replica data is redundantly stored across data sources 140, providing data availability even if one of data sources 140 becomes unavailable. Data sources 140 may be accessible to client 110, general server 120, and workload server 130 via the network 190.

General server 120 may be a web server, mail server, video server, music server, online gaming server, or any other server known to those of skill in the art. As depicted, general server 120 includes computation module 125. Computation module 125 may be configured to access large volumes of data on one or more data sources 140. In some embodiments computation module 125 performs analytical analysis (e.g., analytics) on data obtained from data sources 140. For example, computation module 125 may analyze data from data sources 140 to determine the demographic distribution of individuals using an online shopping application. In other embodiments, client 110 accesses an online shopping application that is hosted on general server 120.

As depicted, workload server 130 includes workload balancing module 132 and persistent storage 138. Workload balancing module 132 may be configured to monitor and maintain the I/O workload across data sources 140. In some embodiments workload balancing module 132 creates a data retrieval plan corresponding to computation module 125. The data retrieval plan may be stored on persistent storage 138.

The data retrieval plan may be used to identify which of data sources 140 may have the greatest expected available bandwidth. Workload balancing module 132 uses the data retrieval plan to retrieve data. Additionally, workload balancing module 132 monitors the I/O instructions per second (IOPS) and data access response time to assure neither exceeds a selected threshold. If the IOPS threshold or response time threshold is exceeded, then workload balancing module 138 may throttle workload balancing module 132 to prevent client 110 from experiencing delays due related to data access.

As depicted, workload balancing module 132 is on workload server 130, however, workload balancing module 132 may be part of general server 120, or any other computing device capable of communicating with data sources 140 over network 190. Similarly, computation module 125 is depicted as residing on general server 120, however, computation module 125 may be part of any other computing device capable of capable of executing machine-readable program instructions and communicating with data sources 140 over network 190. In some embodiments, workload balancing module 132 and computation module 125 reside on the same server (e.g., workload server 130).

Persistent storage 138 and 148 (e.g., 148-1 through 148-N) may be any non-volatile storage device or media known in the art. For example, persistent storage 138 and 148 can be implemented with a tape library, optical library, solid state storage, one or more independent hard disk drives, or multiple hard disk drives in a redundant array of independent disks (RAID). Similarly, data on persistent storage 138 and 148 may conform to any suitable storage architecture known in the art, such as a file, a relational database, an object-oriented database, and/or one or more tables.

Client 110, general server 120, workload server 130, data sources 140, and other electronic devices (not shown) communicate over network 190. Network 190 can be, for example, a local area network (LAN), a wide area network (WAN) such as the Internet, or a combination of the two, and include wired, wireless, or fiber optic connections. In general, network 190 can be any combination of connections and protocols that will support communications between client 110, general server 120, workload server 130, and data sources 140 in accordance with an embodiment of the present invention.

Figure 2:
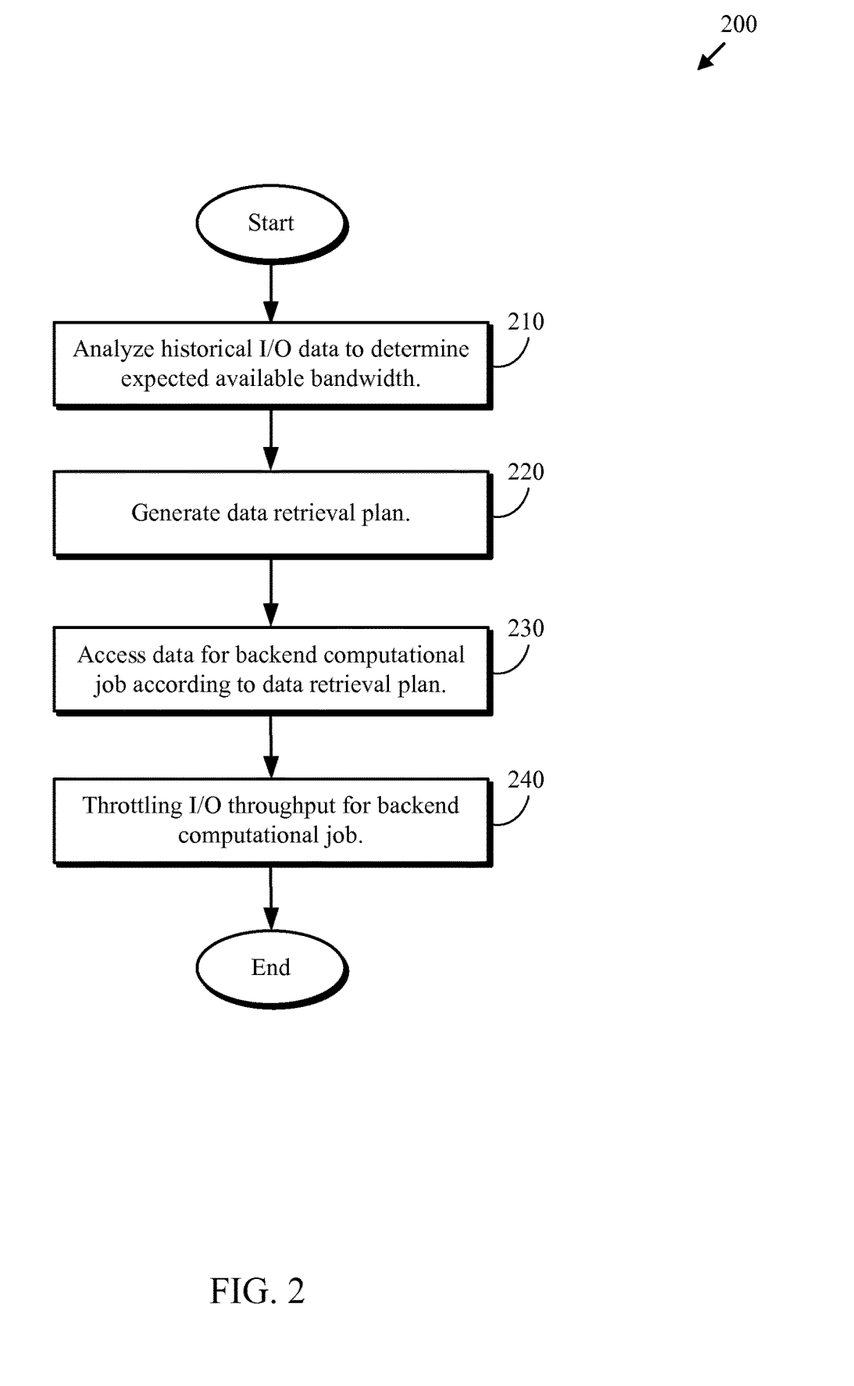
FIG. 2 is a flowchart depicting a workload balancing method, in accordance with at least one embodiment of the present invention.

FIG. 2 is a flowchart depicting a workload balancing method 200, in accordance with at least one embodiment of the present invention. As depicted, workload balancing method 200 includes analyzing (210) historical I/O data, generating (220) a data retrieval plan, accessing (230) data for a backend computational job, and throttling (240) I/O throughput for the backend computational job. Workload balancing method 200 enables workload balancing module 132 to create a data retrieval plan for backend computational jobs, and to monitor I/O throughput and for the data sources (e.g. data sources 140) of a distributed storage system. In some embodiments, a data retrieval plan corresponds to a to a specific backend computational job. In other embodiments, a data retrieval plan is shared by similar backend computational jobs.

Analyzing (210) historical I/O data may include workload balancing module 132 analyzing (monitoring) historical I/O data corresponding to a specific data source (e.g., disk drive) to determine the I/O bandwidth usage. In some embodiments, workload balancing module 132 analyzes I/O corresponding to frontend (external) applications. In some embodiments, workload balancing module 132 analyzes I/O corresponding to and backend (internal) computational jobs. In some embodiments, workload balancing module 132 determines an average I/O bandwidth usage over one or more selected durations, providing a historical I/O access pattern.

Generating (220) a data retrieval plan may include workload balancing module 132 determining which disks within a distributed storage system have the greatest expected bandwidth availability at the time an internal computational job is expected to run. The data retrieval plan may include: (i) a disk identifier for each of the disks (data sources) that include data corresponding to the backend computational job; (ii) a total bandwidth for each of the disks (data sources) that include data corresponding to the backend computational job; (iii) an expected available bandwidth for each of the disks (data sources) that include data corresponding to the backend computational job; and (iv) identifiers corresponding to data replicas on each of the disks that include data corresponding to the backend computational job.

In some embodiments, the data retrieval plan is generated for a specified time (e.g., Monday at 13:00:00) and for a specified duration (e.g., 20 minutes). If the internal computational job does not complete between 13:00:00 and 13:19:59 on Monday, then a subsequent data retrieval plan for Monday at 13:20:00 for 20 minutes is used to continue retrieving data for the backend computational job. In other embodiments, the internal computational job uses a single data retrieval plan regardless of how long the data retrieval operation lasts. Generating a data retrieval plan will be described in greater detail with regard to FIG. 3.

Accessing (230) data for a backend computational job may include workload balancing module 132 using the data retrieval plan to determine which disk or disks should be accessed to during a data retrieval operation for a backend computational job. In some embodiments, data from different data replicas is to be retrieved in parallel from multiple disks. In other embodiments, to data is retrieved from one disk at a time.

Throttling (240) I/O throughput for the backend computational job may include workload balancing module 132 monitoring the I/O instructions per second (IOPS) throughput and I/O response time corresponding to the disk from which data is being retrieved to assure that frontend jobs do not experience delays due to the backend computational job data retrieval operations. In some embodiments, if the bandwidth throughput exceeds a selected threshold, then workload balancing module 132 suppresses the I/O throughput corresponding to the backend computational job. In some embodiments, if the I/O response time exceeds a selected threshold, then workload balancing module 132 suppresses the I/O throughput corresponding to the backend computational job.

Figure 3:
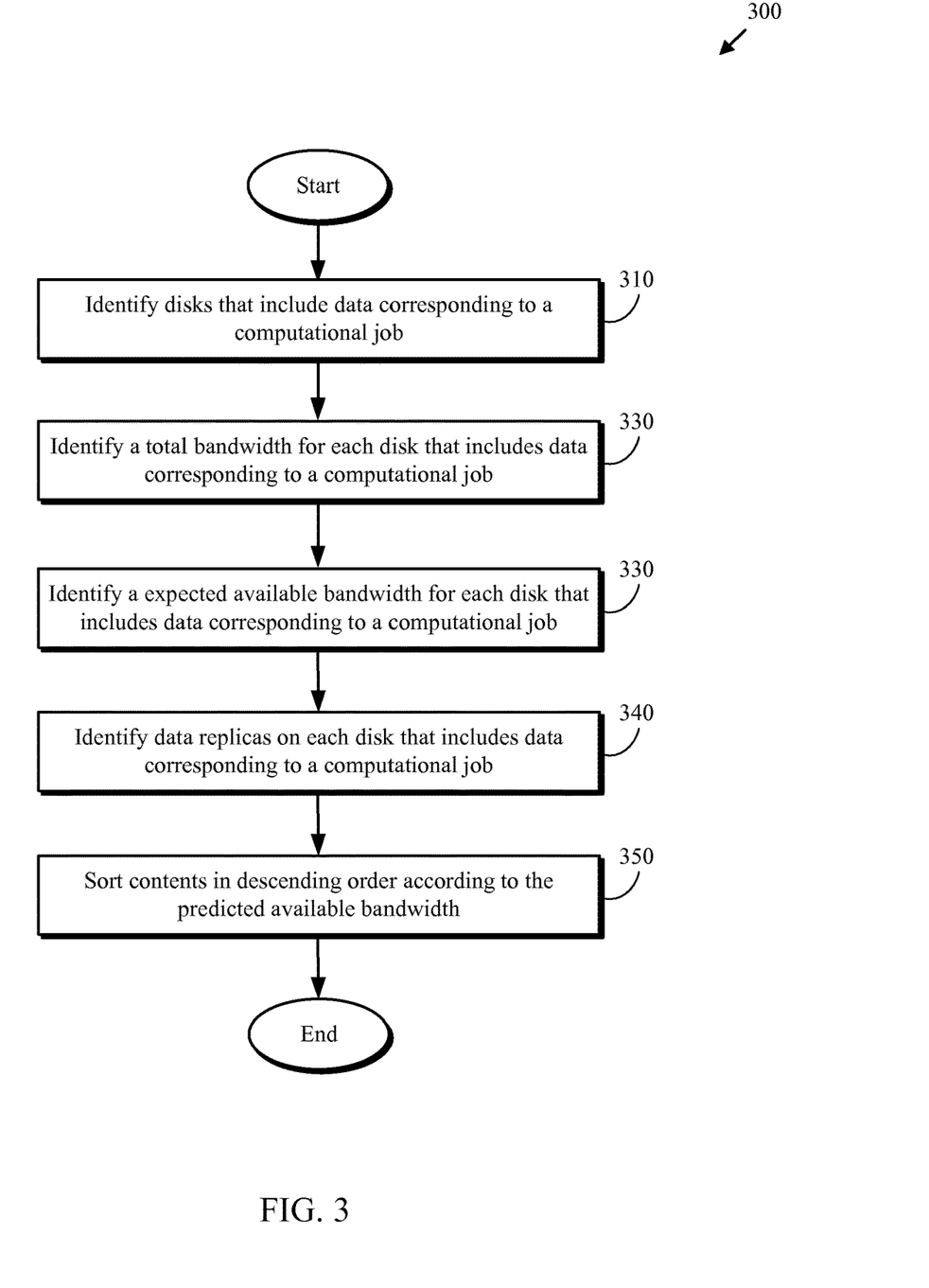
FIG. 3 is a flowchart depicting a method for generating a data retrieval plan, in accordance with at least one embodiment of the present invention.

FIG. 3 is a flowchart depicting a method for generating a data retrieval plan (hereinafter referred to as plan generation method 300), in accordance with at least one embodiment of the present invention. As depicted, plan generation method 300 includes identifying (310) disks that include data corresponding to a backend computational job, identifying (320) a total bandwidth for each disk, identifying (330) an expected available bandwidth for each disk, identifying (340) data replicas on each disk, and sorting (350) the contents of the data retrieval plan. Plan generation method 300 enables workload balancing module 132 to create a data retrieval plan corresponding to a backend computational job that identifies disks with the maximum expected available bandwidth. The data retrieval plan may include disk identifiers, total bandwidth for a disk, expected available bandwidth for the disk, and data replica identifiers indicating which data replicas are on which disks.

Identifying (310) disks that include data corresponding to a backend computational job may include workload balancing module 132 determining which of the data sources included in a distributed storage system (e.g., data sources 140-1 through 140-N) contain data that is required to be read by an internal computational job (e.g., a job that is run by computation module 125). In some embodiments, there is redundant replica data stored on more than one of the data sources 140. Each disk containing a copy of data required by the backend computational job may be included in the data retrieval plan.

Identifying (320) a total bandwidth for each disk may include workload balancing module 132 using techniques familiar to those of skill in the art to determine the total I/O bandwidth that each of the data sources is capable of handling. Storage medium characteristics (e.g., solid state drives, hard disk drives, network attached storage) may be included in total bandwidth calculation.

Identifying (330) an expected available bandwidth for each disk may include workload balancing module 132 using the historical I/O access pattern (which includes the average I/O bandwidth usage) to determine the expected available bandwidth corresponding to each data source over a duration. The expected available bandwidth of a disk may be calculated by subtracting the average I/O bandwidth from the total bandwidth. Storage medium characteristics (e.g., solid state drives, hard disk drives, network attached storage) may be included in the expected available bandwidth calculation.

Identifying (340) data replicas on each disk may include workload balancing module 132 identifying all data that a backend computational job will be retrieving from a distributed storage system. The data may reside in multiple file systems and/or databases within a distributed storage system. The data may also be replicated on more than one data source (disk) within the distributed storage system. Workload balancing module 132 may then identify, using a replica identifier, which data replicas are stored on which disks (e.g., data stores 140-1 through 140-N).

Sorting (350) the contents of the data retrieval plan may include workload balancing module 132 sorting the data retrieval plan, in descending order, accord to expected available bandwidth. In some embodiments, all duplicated data replica references are removed, retaining only the reference to the replica data that is associated with the highest expected available bandwidth. In other embodiments, all data replica references are retained enabling a failover plan if the retrieval from the first replica is unsuccessful. An example of a data retrieval plan is described in FIG. 4.

Figure 4:
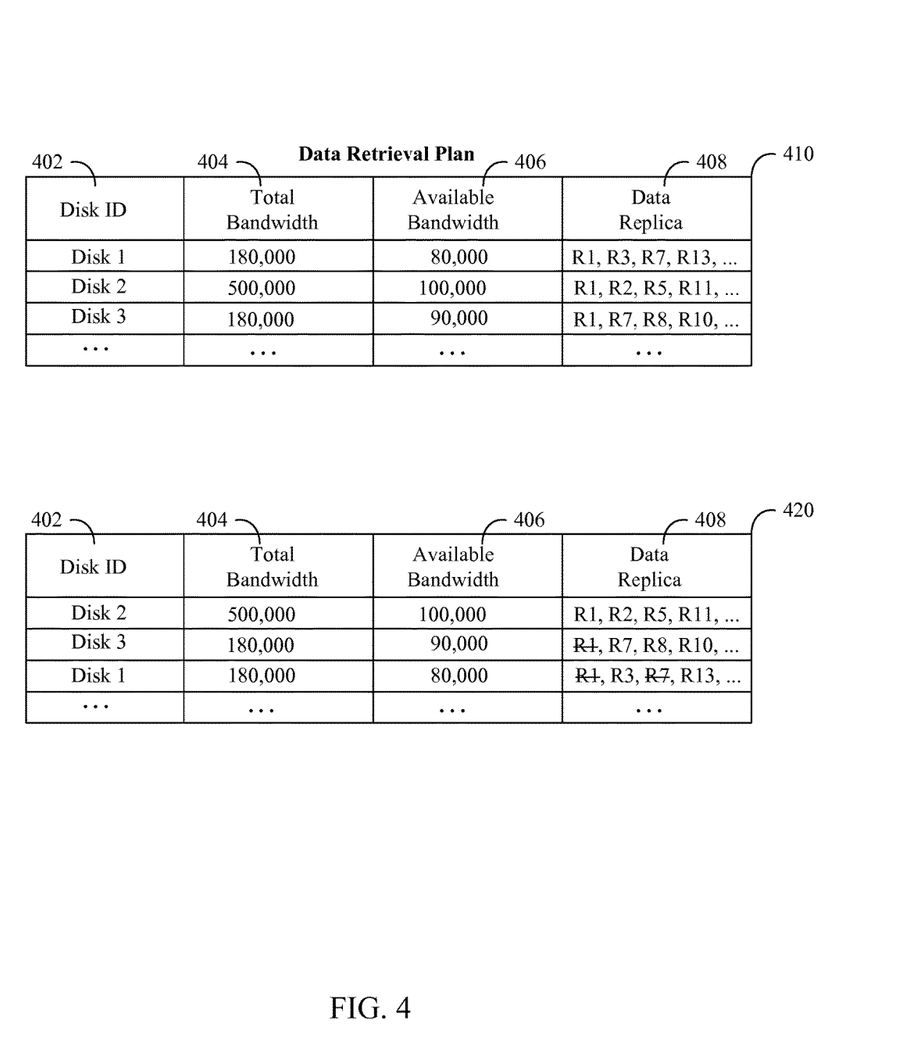
FIG. 4 depicts an example data retrieval plan, in accordance with at least one embodiment of the present invention.

FIG. 4 depicts an example data retrieval plan 400, in accordance with at least one embodiment of the present invention. Example 400 includes table 410 which depicts the data retrieval plan after all data retrieval information has been gathered, but prior to sorting or processing any of the data. Column 402 includes disk identifiers. The each disk identifier represents a disk in the distributed storage system (e.g., persistent storage 148-1 through 148-N of FIG. 1). Column 404 includes the total bandwidth associated with each disk. Total bandwidth is the maximum throughput, measured in I/O instructions per second (IOPS) that can be achieved. Column 406 includes the (expected) available bandwidth (e.g., the unused bandwidth), measured in IOPS, corresponding to each disk. Column 408 includes identifiers for data replicas on each disk. Data may exist on only one disk, or may be replicated on multiple disks. As depicted in data retrieval plan 400 data replica R1 is replicated on Disk 1, Disk 2, and Disk 3, and data replica R7 is replicated on Disk 1 and Disk 3.

Table 420 depicts the data retrieval plan after additional sorting and processing have completed. Table 420 contains information about the same disks as table 410, however, table 420 has been sorted according to (expected) available bandwidth (406). Additionally, duplicate entries for replicated data have been removed from the data replica column (408), leaving only the replica data corresponding to the disk with the largest (expected) available bandwidth (406). When the backend computational job corresponding to this data retrieval plan is executed, the data corresponding to data replica R1 will be retrieved from disk 2 rather than disk 3 or disk 1 because disk 2 has the largest expected available bandwidth. Similarly, the data corresponding to data replica R7 will be retrieved from disk 3 rather than disk 1.

Figure 5:
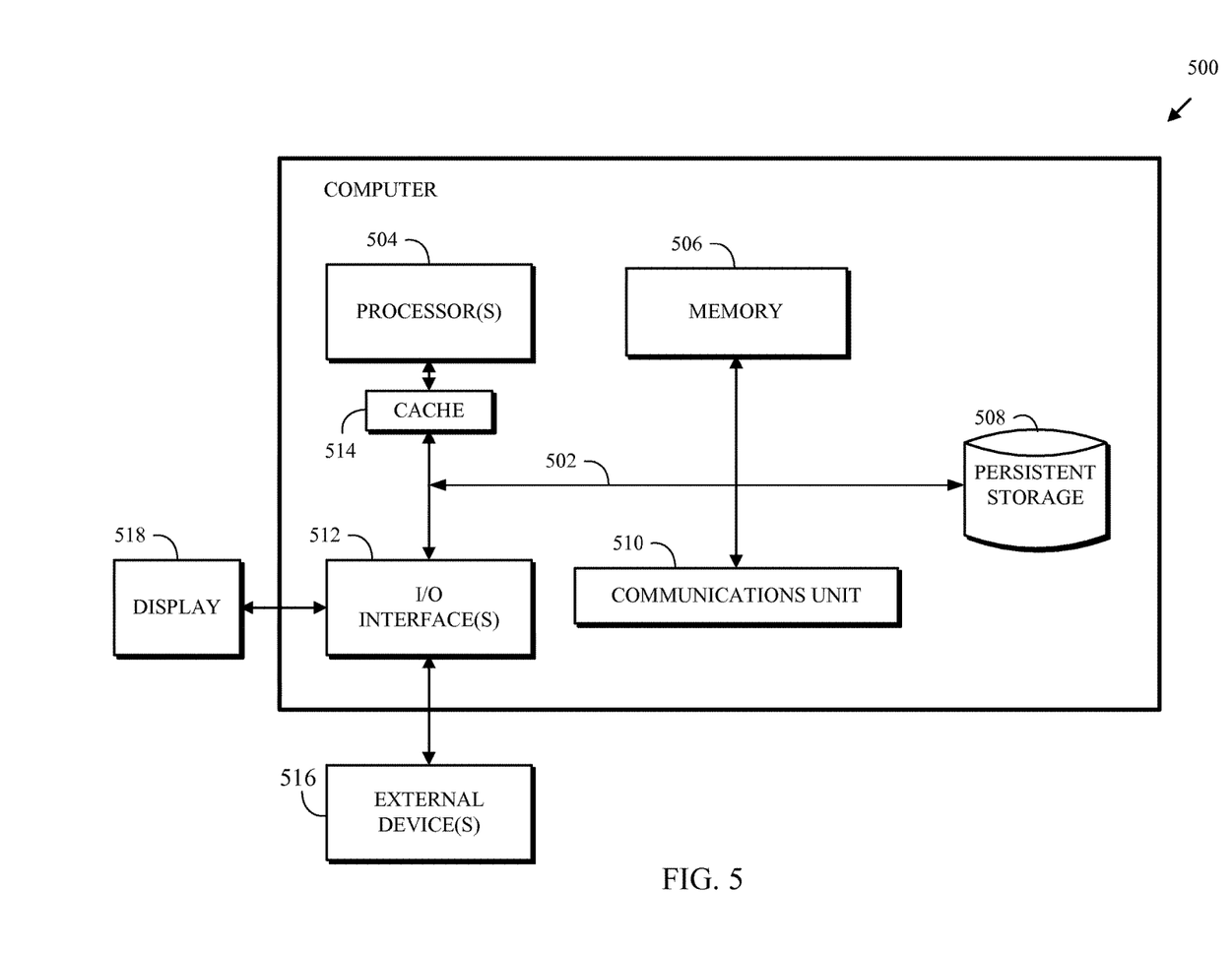
FIG. 5 is a functional block diagram depicting various components of one embodiment of a computer suitable for executing the methods disclosed herein.

FIG. 5 depicts a functional block diagram of components of a computer system 500, which is an example of systems such as client 110, general server 120, workload server 130, and data sources 140 within computing environment 100 of FIG. 1, in accordance with an embodiment of the present invention. It should be appreciated that FIG. 5 provides only an illustration of one implementation and does not imply any limitations with regard to the environments in which different embodiments can be implemented. Many modifications to the depicted environment can be made.

Client 110, general server 120, workload server 130, and data sources 140 include processor(s) 504, cache 514, memory 506, persistent storage 508, communications unit 510, input/output (I/O) interface(s) 512 and communications fabric 502. Communications fabric 502 provides communications between cache 514, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM). In general, memory 506 can include any suitable volatile or non-volatile computer readable storage media. Cache 514 is a fast memory that enhances the performance of processor(s) 504 by holding recently accessed data, and data near recently accessed data, from memory 506.

Program instructions and data used to practice embodiments of the present invention (e.g., workload balancing method 200 and plan generation method 300) are stored in persistent storage 508 for execution and/or access by one or more of the respective processor(s) 504 via cache 514. In this embodiment, persistent storage 508 includes a magnetic hard disk drive. Alternatively, or in addition to a magnetic hard disk drive, persistent storage 508 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of client 110, general server 120, workload server 130, and data sources 140. In these examples, communications unit 510 includes one or more network interface cards. Communications unit 510 may provide communications through the use of either or both physical and wireless communications links. Program instructions and data used to practice embodiments of workload balancing method 200 and plan generation method 300 may be downloaded to persistent storage 508 through communications unit 510.

I/O interface(s) 512 allows for input and output of data with other devices that may be connected to each computer system. For example, I/O interface(s) 512 may provide a connection to external device(s) 516 such as a keyboard, a keypad, a touch screen, a microphone, a digital camera, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to a display 518.

Display 518 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method comprising:
   determining, by a processor, a maximum bandwidth for a storage device included in a plurality of storage devices of a distributed storage system;
   determining, by the processor, a predicted bandwidth consumption for one or more frontend applications associated with the storage device during a time period based on a historical bandwidth consumption data that corresponds to the one or more frontend applications;
   determining, by the processor, a portion of the maximum bandwidth that is predicted to be available during the time period for a backend computational job for the storage device,
   determining, by the processor, whether a sum of (i) the portion of the maximum bandwidth and (ii) the predicted bandwidth consumption for one or more frontend applications is at most equal to the maximum bandwidth for the storage device;
   generating, by a processor, a data retrieval plan for the plurality of storage devices based on (i) whether the sum is at most equal to the maximum bandwidth for the storage device, (ii) the portion of the maximum bandwidth, (iii) the predicted bandwidth consumption for one or more frontend applications, (iv) a historical I/O access pattern for each given storage device of the plurality of storage devices, and (v) an expected available bandwidth for each given storage device of the plurality of storage devices during the time period;
   processing, by a processor, the backend computational job using the plurality of storage devices according to the data retrieval plan, wherein the data is retrieved from a given storage device of the plurality of storage devices, and wherein the given storage device is selected such that a sum of (i) a predicted bandwidth consumption for one or more frontend applications associated with the given storage device during the time period and (ii) a predicted bandwidth consumption for the backend computational job processing on the given storage device is (iii) at most equal to a maximum bandwidth for the given storage device; and
   throttling, by a processor, I/O throughput for the backend computational job according to the expected available bandwidth for the plurality of storage devices, wherein the I/O throughput is throttled to a throughput of greater than zero I/O instructions per second (IOPS), and wherein throttling comprises monitoring IOPS and suppressing the I/O throughput for the backend computational job when the IOPS exceeds a selected threshold.

2. The method of claim 1, wherein generating a data retrieval plan includes determining all data to be accessed for the backend computational job.

3. The method of claim 1, wherein the data retrieval plan comprises:
   a disk identifier for each of the plurality of storage devices that include data corresponding to the backend computational job;
   a maximum bandwidth for each of the plurality of storage devices that include data corresponding to the backend computational job;
   the expected available bandwidth for each of the plurality of storage devices that include data corresponding to the backend computational job; and
   identifiers corresponding to data replicas on each of the plurality of storage devices that include data corresponding to the backend computational job.

4. The method of claim 1, wherein the historical I/O access pattern is determined by analyzing the historical I/O data.

5. The method of claim 1, wherein storage medium characteristics are variables included in a maximum bandwidth calculation and an expected available bandwidth calculation.

6. The method of claim 1, wherein throttling comprises monitoring I/O response time and suppressing the I/O throughput for the backend computational job if the I/O response time exceeds a selected threshold.

7. A computer program product comprising:
   one or more computer readable storage media and program instructions stored on the one or more computer readable storage media, the program instructions executable by a computer to perform:
   determining, by a processor, a maximum bandwidth for a storage device included in a plurality of storage devices of a distributed storage system;
   determining, by the processor, a predicted bandwidth consumption for one or more frontend applications associated with the storage device during a time period based on a historical bandwidth consumption data that corresponds to the one or more frontend applications;
   determining, by the processor, a portion of the maximum bandwidth that is predicted to be available during the time period for a backend computational job for the storage device, determining, by the processor, whether a sum of (i) the portion of the maximum bandwidth and (ii) the predicted bandwidth consumption for one or more frontend applications is at most equal to the maximum bandwidth for the storage device;

generating, by a processor, a data retrieval plan for the plurality of storage devices based on (i) whether the sum is at most equal to the maximum bandwidth for the storage device, (ii) the portion of the maximum bandwidth, (iii) the predicted bandwidth consumption for one or more frontend applications, (iv) a historical I/O access pattern for each given storage device of the plurality of storage devices, and (v) an expected available bandwidth for each given storage device of the plurality of storage devices during the time period;

processing, by a processor, the backend computational job using the plurality of storage devices according to the data retrieval plan, wherein the data is retrieved from a given storage device of the plurality of storage devices, and wherein the given storage device is selected such that a sum of (i) a predicted bandwidth consumption for one or more frontend applications associated with the given storage device during the time period and (ii) a predicted bandwidth consumption for the backend computational job processing on the given storage device is (iii) at most equal to a maximum bandwidth for the given storage device; and throttling, by a processor, I/O throughput for the backend computational job according to the expected available bandwidth for the plurality of storage devices, wherein the I/O throughput is throttled to a throughput of greater than zero I/O instructions per second (IOPS), and wherein throttling comprises monitoring IOPS and suppressing the I/O throughput for the backend computational job when the IOPS exceeds a selected threshold.

8. The computer program product of claim 7, wherein the program instructions for generating a data retrieval plan include instructions for determining all data to be accessed for the backend computational job.

9. The computer program product of claim 7, wherein the data retrieval plan comprises:
a disk identifier for each of the plurality of storage devices that include data corresponding to the backend computational job;
a maximum bandwidth for each of the plurality of storage devices that include data corresponding to the backend computational job;
the expected available bandwidth for each of the plurality of storage devices that include data corresponding to the backend computational job; and
identifiers corresponding to data replicas on each of the plurality of storage devices that include data corresponding to the backend computational job.

10. The computer program product of claim 7, wherein storage medium characteristics are variables included in a maximum bandwidth calculation and an expected available bandwidth calculation.

11. The computer program product of claim 7, wherein the program instruction for throttling include instructions for monitoring I/O response time and suppressing the I/O throughput for the backend computational job if the I/O response time exceeds a selected threshold.

12. A computer system comprising:
one or more computer processors;
one or more computer readable storage media;
program instructions stored on the computer readable storage media for execution by at least one of the computer processors, the program instructions executable by a computer to perform:
determining, by a processor, a maximum bandwidth for a storage device included in a plurality of storage devices of a distributed storage system;
determining, by the processor, a predicted bandwidth consumption for one or more frontend applications associated with the storage device during a time period based on a historical bandwidth consumption data that corresponds to the one or more frontend applications;
determining, by the processor, a portion of the maximum bandwidth that is predicted to be available during the time period for a backend computational job for the storage device,
determining, by the processor, whether a sum of (i) the portion of the maximum bandwidth and (ii) the predicted bandwidth consumption for one or more frontend applications is at most equal to the maximum bandwidth for the storage device;
generating, by a processor, a data retrieval plan for the plurality of storage devices based on (i) whether the sum is at most equal to the maximum bandwidth for the storage device, (ii) the portion of the maximum bandwidth, (iii) the predicted bandwidth consumption for one or more frontend applications, (iv) a historical I/O access pattern for each given storage device of the plurality of storage devices, and (v) an expected available bandwidth for each given storage device of the plurality of storage devices during the time period;
processing, by a processor, the backend computational job using the plurality of storage devices according to the data retrieval plan, wherein the data is retrieved from a given storage device of the plurality of storage devices, and wherein the given storage device is selected such that a sum of (i) a predicted bandwidth consumption for one or more frontend applications associated with the given storage device during the time period and (ii) a predicted bandwidth consumption for the backend computational job processing on the given storage device is (iii) at most equal to a maximum bandwidth for the given storage device; and
throttling, by a processor, I/O throughput for the backend computational job according to the expected available bandwidth for the plurality of storage devices, wherein the I/O throughput is throttled to a throughput of greater than zero I/O instructions per second (IOPS), and wherein throttling comprises monitoring IOPS and suppressing the I/O throughput for the backend computational job when the IOPS exceeds a selected threshold.

13. The computer system of claim 12, wherein the program instructions for generating a data retrieval plan include instructions for determining all data to be accessed for the backend computational job.

14. The computer system of claim 12, wherein the data retrieval plan comprises:
a disk identifier for each of the plurality of storage devices that include data corresponding to the backend computational job;

a maximum bandwidth for each of the plurality of storage devices that include data corresponding to the backend computational job;

the expected available bandwidth for each of the plurality of storage devices that include data corresponding to the backend computational job; and identifiers corresponding to data replicas on each of the plurality of storage devices that include data corresponding to the backend computational job.

15. The computer system of claim 12, wherein storage medium characteristics are variables included in a maximum bandwidth calculation and an expected available bandwidth calculation.

16. The computer system of claim 12, wherein the program instruction for throttling include instructions for monitoring I/O response time and suppressing the I/O throughput for the backend computational job if the I/O response time exceeds a selected threshold.

* * * * *